US012625719B2

(12) United States Patent
Jabbar et al.

(10) Patent No.: US 12,625,719 B2
(45) Date of Patent: May 12, 2026

(54) DYNAMIC VISIBILITY AND AUTHORIZATION POLICY MANAGEMENT FOR A CLOUD SERVICE PLATFORM

(71) Applicant: Dell Products, L.P., Round Rock, TX (US)

(72) Inventors: Ameer Jabbar, Lilburn, GA (US); Juan Pablo Jofre, Black Diamond, WA (US); Ching-Yun Chao, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 408 days.

(21) Appl. No.: 18/350,149

(22) Filed: Jul. 11, 2023

(65) Prior Publication Data

US 2025/0021364 A1     Jan. 16, 2025

(51) Int. Cl.
*G06F 9/455*          (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | | |
|---|---|---|---|---|
| 10,999,413 | B1 * | 5/2021 | Gino ..................... | H04L 67/561 |
| 2021/0224044 | A1 * | 7/2021 | Soini ......................... | G06F 8/38 |
| 2022/0269582 | A1 * | 8/2022 | Spiro ........................ | G06F 8/65 |
| 2022/0334950 | A1 * | 10/2022 | Balan ........................ | G06F 8/60 |
| 2023/0100322 | A1 * | 3/2023 | Mengwasser ......... | G06F 9/3844 |
| | | | | 712/239 |
| 2024/0338306 | A1 * | 10/2024 | Waxman .................. | G06F 9/54 |

OTHER PUBLICATIONS

Google Cloud, "Google Kubernetes Engine (GKE)", Available online at URL : https://cloud.google.com/kubernetes-engine, Retrieved on Feb. 19, 2026, 9 pages.
Google Cloud, "Google Kubernetes Engine documentation", Google Kubernetes Engine (GKE), Available online at URL : https://docs.cloud.google.com/kubernetes-engine/docs, Retrieved on Feb. 19, 2026, 4 pages.

(Continued)

*Primary Examiner* — Sisley N Kim

(74) *Attorney, Agent, or Firm* — Amin, Turocy & Watson, LLP

(57)          ABSTRACT

Architectures and techniques are described that can improve cloud service platforms by improving developer experiences throughout the development process and lifecycle of project offerings and by reducing platform resources utilized to facilitate the development process of the project offerings. For example, a container orchestration platform can be modified to allow policies for a project to be automatically generated, using templates, based on a declarative approach. By subsequently modifying the generated policies (e.g., creating different versions for different testing configurations), the projects can be conveniently tested against stable environments without the need to instantiate new instances of these stable environments for each offering under test.

20 Claims, 11 Drawing Sheets

(56)     References Cited

OTHER PUBLICATIONS

Google Cloud, "Quickstart: Deploy an App to a GKE Cluster", Google Kubernetes Engine (GKE), Available online at URL : https://docs.cloud.google.com/kubernetes-engine/docs/deploy-app-cluster, Retrieved on Feb. 19, 2026, 7 pages.

Google Cloud, "Configure Network Policies for Applications", GKE Networking, Available online at URL : https://docs.cloud.google.com/kubernetes-engine/docs/tutorials/network-policy, Retrieved on Feb. 19, 2026, 9 pages.

Google Cloud, "Control Communication Between Pods and Services Using Network Policies", GKE Networking, Available online at URL : https://docs.cloud.google.com/kubernetes-engine/docs/how-to/network-policy, Retrieved on Feb. 19, 2026, 12 pages.

Kubernetes, "Kubernetes Documentation", Available online at URL : https://kubernetes.io/docs/home/, Retrieved on Feb. 19, 2026, 3 pages.

Kubernetes, "Network Policies", Available online at URL : https://kubernetes.io/docs/concepts/services-networking/network-policies/, Retrieved on Feb. 19, 2026, 10 pages.

Kubernetes, "Declare Network Policy", Available online at URL : https://kubernetes.io/docs/tasks/administer-cluster/declare-network-policy/, Retrieved on Feb. 19, 2026, 4 pages.

Cilium, "NetworkPolicy Editor: Create, Visualize, and Share Kubernetes NetworkPolicies", Available online at URL : https://cilium.io/blog/2021/02/10/network-policy-editor/, Feb. 10, 2021, 9 pages.

Cilium, "Using Kubernetes Constructs in Policy", Available online at URL : https://docs.cilium.io/en/stable/security/policy/kubernetes/#clusterwide-policies, Retrieved on Feb. 19, 2026, 9 pages.

Cilium, "eBPF based Networking, Observability, Security", Available online at URL : https://cilium.io/, Retrieved on Feb. 20, 2026, 8 pages.

Rafay, "Self Service Compute Consumption on the Rafay Platform", Available online at URL : https://rafay.co/solutions/self-service, Retrieved on Feb. 20, 2026, 5 pages.

Harrison, Reuven, "Generating Kubernetes Network Policies Automatically", Available online at URL : https://tufin.medium.com/generating-kubernetes-network-policies-automatically-678ca0411, Retrieved on Oct. 25, 2019, 10 pages.

Tufin, "Secure and Unify Cloud and On-premises Networks", Available online at URL : https://www.tufin.com/solutions/cloud, Retrieved on Feb. 20, 2026, 12 pages.

Microsoft, "Build a CI/CD pipeline for microservices on Kubernetes with Azure DevOps and Helm", Azure Architecture Center, Available online at URL : https://learn.microsoft.com/en-us/azure/architecture/microservices/ci-cd-kubernetes, Retrieved on Feb. 20, 2026, 12 pages.

Microsoft, "Classic Release Pipelines", Azure Pipelines, Available online at URL : https://learn.microsoft.com/en-us/azure/devops/pipelines/release/?view=azure-devops, Retrieved on Feb. 20, 2026, 8 pages.

Microsoft, "Azure Pipelines agents", Azure Pipelines, Available online at URL : https://learn.microsoft.com/en-us/azure/devops/pipelines/agents/agents?view=azure-devops&tabs=yaml%2Cbrowser, Retrieved on Feb. 20, 2026, 25 pages.

Rafay, Network Policy Manager: Centrally Manage all the Network Policies for your Kubernetes Infrastructure, Available online at: https://rafay.co/platform/kubernetes-network-policy-manager.

* cited by examiner

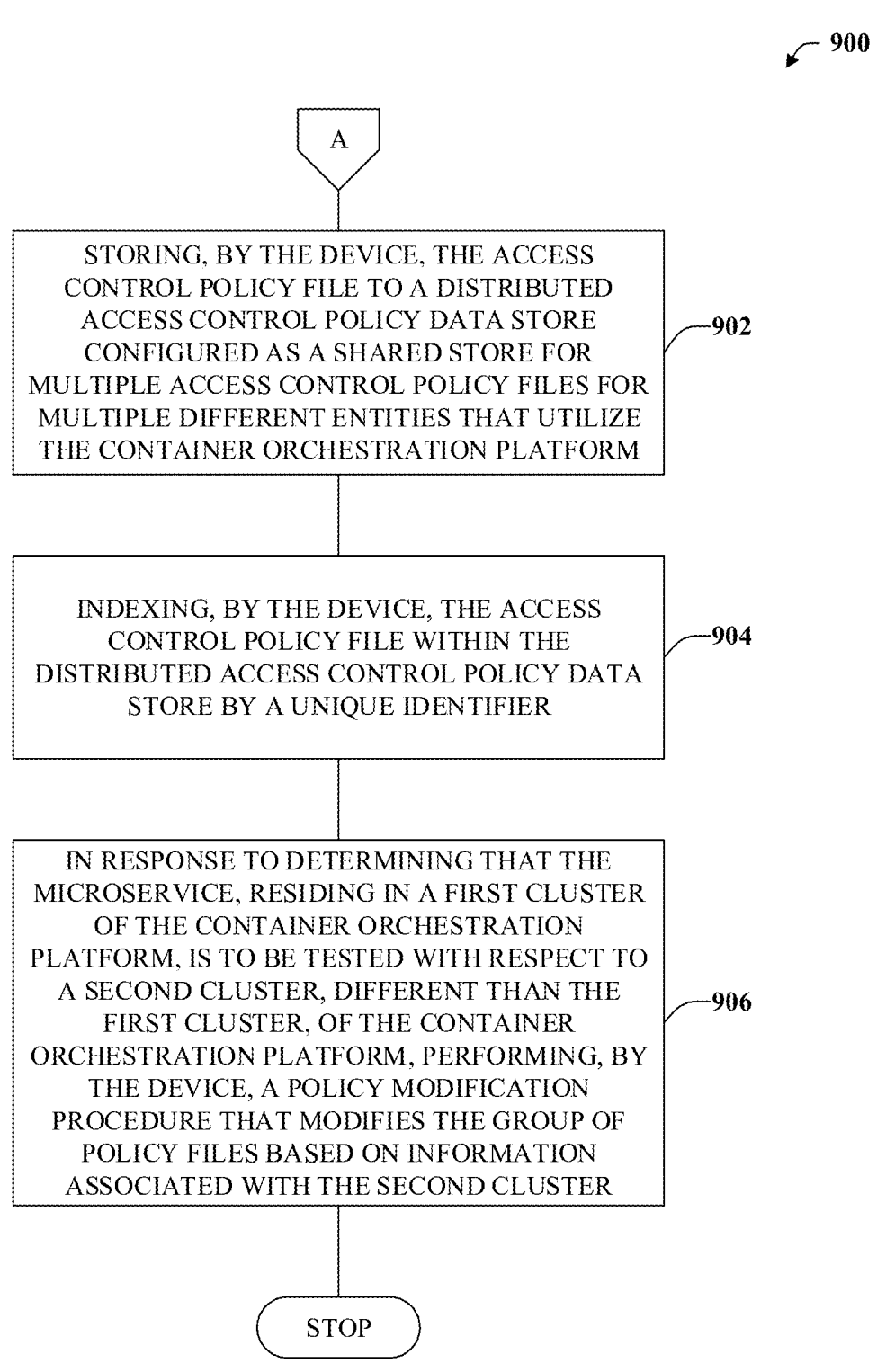

*900*

A

STORING, BY THE DEVICE, THE ACCESS CONTROL POLICY FILE TO A DISTRIBUTED ACCESS CONTROL POLICY DATA STORE CONFIGURED AS A SHARED STORE FOR MULTIPLE ACCESS CONTROL POLICY FILES FOR MULTIPLE DIFFERENT ENTITIES THAT UTILIZE THE CONTAINER ORCHESTRATION PLATFORM ⎯902

INDEXING, BY THE DEVICE, THE ACCESS CONTROL POLICY FILE WITHIN THE DISTRIBUTED ACCESS CONTROL POLICY DATA STORE BY A UNIQUE IDENTIFIER ⎯904

IN RESPONSE TO DETERMINING THAT THE MICROSERVICE, RESIDING IN A FIRST CLUSTER OF THE CONTAINER ORCHESTRATION PLATFORM, IS TO BE TESTED WITH RESPECT TO A SECOND CLUSTER, DIFFERENT THAN THE FIRST CLUSTER, OF THE CONTAINER ORCHESTRATION PLATFORM, PERFORMING, BY THE DEVICE, A POLICY MODIFICATION PROCEDURE THAT MODIFIES THE GROUP OF POLICY FILES BASED ON INFORMATION ASSOCIATED WITH THE SECOND CLUSTER ⎯906

STOP

FIG. 9

DYNAMIC VISIBILITY AND AUTHORIZATION POLICY MANAGEMENT FOR A CLOUD SERVICE PLATFORM

BACKGROUND

A common arrangement today relates to consuming offers and services provided by a cloud service platform. Many cloud service platform providers also enable value-add resellers and third-party vendors to develop solutions (e.g., applications or microservices) on that provider's cloud service platforms. By opening the cloud service platform to serve as a development platform for others, cloud service platform providers can build an ecosystem to create new offers and services for their cloud service platform. This approach can operate to grow the customer base of the cloud service platform, for instance, by creating a win-win situation among customers, value-add resellers, third-party vendors, and the cloud service platform provider.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 9 illustrates an example method that can provide for additional aspect or elements in connection with automatically generating policies based on high-level declarations in accordance with certain embodiments of this disclosure;

DETAILED DESCRIPTION

Overview

Figure 1:
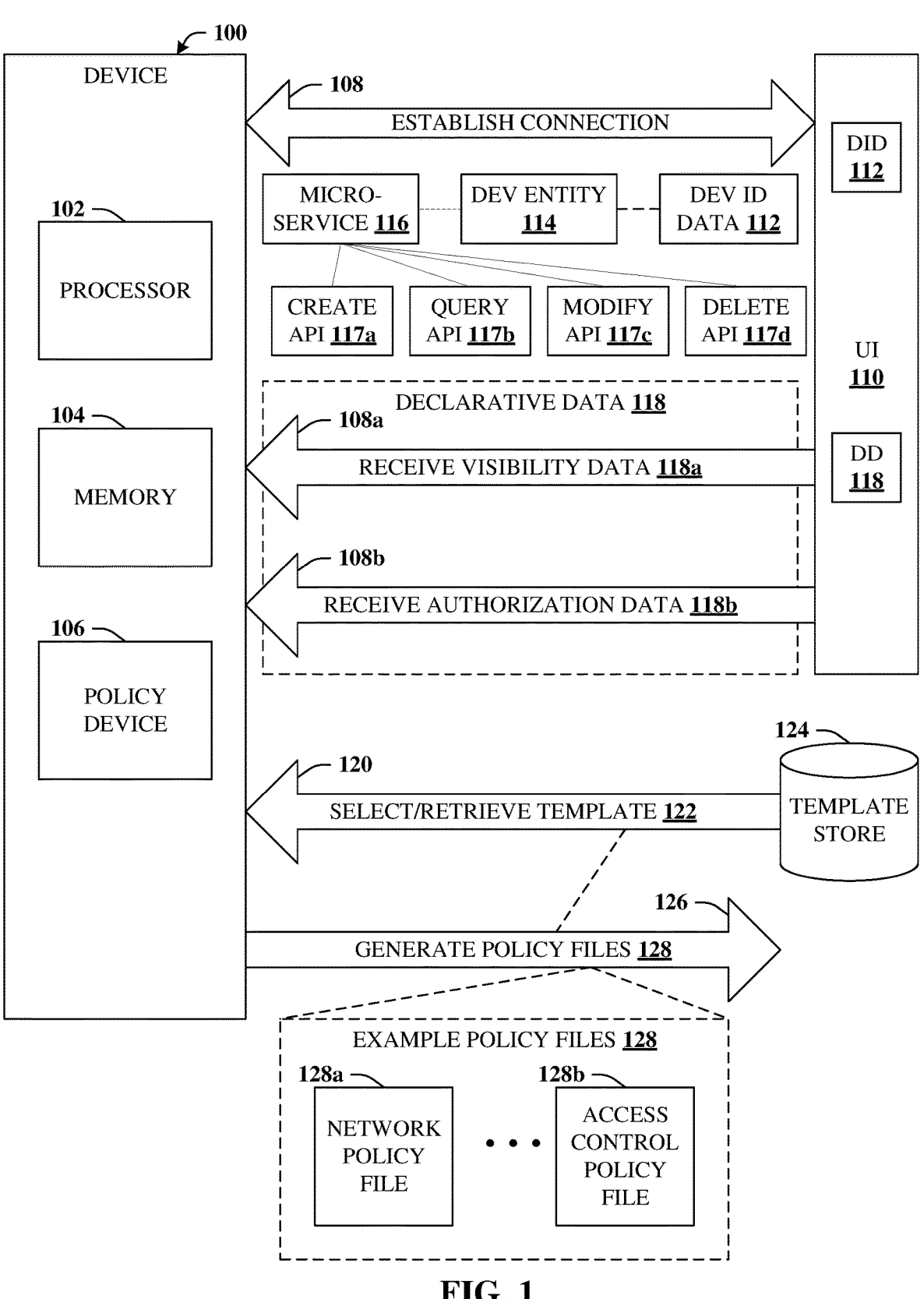
FIG. 1 depicts a schematic block diagram illustrating an example device 100 that can automatically generate policies based on high-level declarations in accordance with certain embodiments of this disclosure.

As noted in the Background section, it can be advantageous to all parties involved to position a cloud service platform as a development platform. However, to do so requires more than merely exposing some application programming interfaces (APIs) to third party developers so that those developers can build value-add offerings or new services. To attract developers to the platform or to accelerate growth of an ecosystem, a platform typically should attempt to create a superior developer experience. Such can include simplifying or automating certain development operations, which can operate to improve developer experiences and/or reduce related development costs, both in terms of time and money. Likewise, a successful platform might also reduce the operational costs to the platform, e.g., to scale the platform with optimal investment, such as, e.g., reducing the resources required for developers to develop, test, and deploy their solutions.

In that regard, the disclosed subject matter can, in certain embodiments, employ techniques to automate the creation of policies (e.g., visibility policies, access control policies, and/or authorization policies) by which the microservice (or application) that is being developed will interact with other entities on the cloud service platform. Moreover, by dynamically modifying those policies, for instance, at various stages of the development process, the resources typically required for testing can be significantly reduced.

As a representative example, the remainder of this disclosure relates to a microservice example and related microservice platforms for the development and deployment of microservices, but it should be understood that the disclosed techniques can be applicable to deployment or development of any suitable application or service.

In some embodiments, a microservice can be thought of as a self-contained, single-purpose application or entity. Whether developing a microservice or a more monolithic application, the developers will typically be concerned with the function of the microservice (or application). However, once the microservice is completed or otherwise ready for deployment to the cloud service platform (e.g., a production environment or cluster), interactions with other entities, such as consumers or other microservices on the cloud service platform, can be managed by policies such as visibility policies that indicate who can see the microservice or certain associated APIs of the microservice, or access control policies that indicate who can access, and/or under what conditions one can access, the microservice or certain associated APIs of the microservice.

Generating these policies may rely on different knowledge or skill sets than those for coding the microservice. Therefore, a mechanism to simplify this process can be advantageous to developers who might prefer to focus their efforts on the microservice code rather than the interaction policy details of the platform. In that regard, the disclosed subject matter can provide a tool or other mechanism that, apart from previous solutions, takes a declarative approach by allowing the developers to simply specify at a high level a type of visibility and authorization desired. Thus, if a microservice exposes four different APIs (e.g., create, query, modify, delete), the developer can merely indicate the desired visibility for each API (e.g., public, internal, private, . . . ) and, based on templates, the appropriate network policies can be automatically generated for the developer.

Similarly, the developer can likewise specify the desired authorization at a high level, and the appropriate access control policies can be automatically generated. This declarative, intent-driven approach can operate to significantly simplify the development of new microservices, which can attract developers to the platform and/or aid in facilitating a robust ecosystem for the platform.

Moreover, it can be further observed that to improve the efficacy of microservice testing during development, it can be very beneficial to allow the developers to test their microservice against a stable environment. In that regard, the platform typically maintains multiple environments or clusters, such as a development (e.g., dev) environment or cluster, a staging environment or cluster, and a production environment or cluster.

Traditionally, each microservice being developed and tested on the platform relied on constructing a unique instance of the environment, which can be extremely expensive in terms of resources. However, it can be observed that by further modifying the policy files (e.g., the very policy files already generated by the platform on behalf of the developer), such can allow the microservice to be tested against an existing environment, thereby potentially reducing resource consumption by N, where N is the number of microservices being concurrently developed and tested.

In other words, even without deploying a microservice to a target environment (e.g., staging, production), the microservice can be tested against that stable environment by dynamically adjusting the policies to be suitable for the target environment. Such can be advantageous for new microservice development as well as for updates to (e.g., newer versions of) a previously deployed microservice. For example, if the microservice already exists in the production environment, a newer version can be tested against the production environment by changing the policies to effectively blend the new version into the target environment, whether to test against the target environment or to test as a part of the target environment. As can be seen, such does not require creating a new environment for testing, but can rather considerably reduce resource consumption by sharing and/or re-using common services that have already been instantiated.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to FIG. 1, a schematic block diagram is depicted illustrating an example device 100 that can automatically generate policies based on high-level declarations in accordance with certain embodiments of this disclosure. In some embodiments, device 100 can be, or can be included in, a container orchestration platform. A non-limiting though representative container orchestration platform used for the remainder of this disclosure is Kubernetes.

Device 100 can comprise a processor 102 that, potentially along with policy device 106, can be specifically configured to perform functions associated with automated policy generation and/or dynamic modification of policies. Device 100 can also comprise memory 104 that stores executable instructions that, when executed by processor 102, can facilitate performance of operations. Processor 102 can be a hardware processor having structural elements known to exist in connection with processing units or circuits, with various operations of processor 102 being represented by functional elements shown in the drawings herein that can require special-purpose instructions, for example, stored in memory 104 and/or policy device 106. Along with these special-purpose instructions, processor 102 and/or policy device 106 can be a special-purpose device. Further examples of the memory 104 and processor 102 can be found with reference to FIG. 11. It is to be appreciated that device 100 or computer 1102 can represent a server device or a client device of a network or network services platform and can be used in connection with implementing one or more of the systems, devices, or components shown and described in connection with FIG. 1 and other figures disclosed herein.

At reference numeral 108, device 100 can establish a connection with user interface (UI) 110. UI 110 can be a user interface for a developer portal of a container orchestration platform (COP), a lightweight software application, or any other suitable element that provides a user interface to obtain input. Said input or the connection can be established based on developer identification data (DID) 112. In some embodiments, developer identification data 112 can be indicative of a namespace of the container orchestration platform that is associated with developer entity 114 that is providing microservice 116. In some embodiments, a namespace can be a logical boundary for a resource or other element.

As illustrated, microservice 116 can include or expose various APIs such as create API 117a, query API 117b, modify API 117c, delete API 117d, or any other suitable API to allow interaction with microservice 116.

UI 110 can further receive as input declarative data (DD) 118, which can be provided to device 100. Declarative data 118 can represent high-level specification of a developer's intent with respect to some or all of the exposed APIs 117 of microservice 116. Declarative data 118 can comprise visibility data 118a, authorization data 118b, or any other suitable type of data.

Visibility data 118a can be indicative of a declaration of a type of visibility to be applied to a given API 117 of microservice 116. The type of visibility can be selected from a group of different types comprising public, internal, private, or another suitable type of visibility. For example, in some embodiments, a public type can indicate an intent that the associated API 117 is to be visible to everyone and/or to all or certain entities outside the namespace, network, or other developer identifier data 112 of developer entity 114. An internal type of visibility can indicate an intent that an associated API 117 is to be visible only to entities that are included in the namespaces or network of developer entity 114, such as other microservices 116 or projects provided by developer entity 114 but in other namespaces associated with developer entity 114. A private type of visibility can indicate an intent that an associated API 117 is to be visible only to entities that are included in the indicated namespace of developer entity 114.

Thus, as illustrated here at reference numerals 108a and 108b, as part of the connection to UI 110, device 100 can receive from UI 110 visibility data 118a and authorization data 118b. As indicated, visibility data 118a can represent a declaration of a type (e.g., public, internal, private) of visibility for each one of the APIs 117 that is desired or intended by developer entity 114. Authorization data 118b can represent a type of authorization desired or intended by developer entity 114, such an indication of which entities are to be provided access to the associated API 117. In some embodiments, authorization data 118b can include one or more conditions, satisfaction of which can allow access to the associated API 117.

At reference numeral 120, device 100 can select and/or retrieve template 122 from template store 124. Selection of template 122 can be based on based on visibility data 118a, authorization data 118b, or other declarative data 118. For example, if visibility data 118a indicates that create API 117a is to be private while query API 117b is to be public, then a private template 122 can be selected for the policy generation regarding API 117a and a public template 122 can be selected for the policy generation regarding API 117b.

It is appreciated that template store 124 can store many different templates that can be indexed, accessed, or selected based on any suitable parameter. In order to give a few non-limiting examples, template 122 may be constructed in the following ways:

```
Public visibility example:
    kind: NetworkPolicy
    apiVersion: networking.k8s.io/v1
    metadata:
        name: public-api-ingress
        namespace: {{namespace}}
    spec:
        podSelector:
            matchExpressions:
                - {{key: app, operator: In, values: ["service-1", "service-2"]}}
        ingress:
            - from:
                - podSelector:
                    matchLabels:
                        app: istio-ingressgateway
                        kubernetes.io/metadata.name: istio-system
            - from:
                - namespaceSelector: { }
            ports:
                - protocol: TCP
                    port: {{8080}}
        policyTypes:
        - Ingress
Private visibility:
    kind: NetworkPolicy
    apiVersion: networking.k8s.io/v1
    metadata:
        name: private-api-ingress
        namespace: {{namespace}}
    spec:
        podSelector:
            matchExpressions:
                - {{key: app, operator: In, values: ["service-1"]}}
        policyTypes:
        - Ingress
```

In these examples, elements in double brackets (e.g., {{ }}) can represent elements that can be substituted during policy generation to tailor the template to the associated microservice 116 and/or a specific API 117.

At reference numeral 126, device 100 can generate a group of policy files 128 based on respective templates 122 and/or, either directly or indirectly, based on any suitable declarative data 118. The group of policy files 128 can include one or more network policy files 128a for each API 117, one or more access control policy file 128b for each API 117, or other suitable policy files 128. For example, network policy file 128a can be generated based on visibility data 118a and at least one associated template 122. Access control policy file 128b can be generated based on authorization data 118b and at least one associated template 122.

Figure 2:
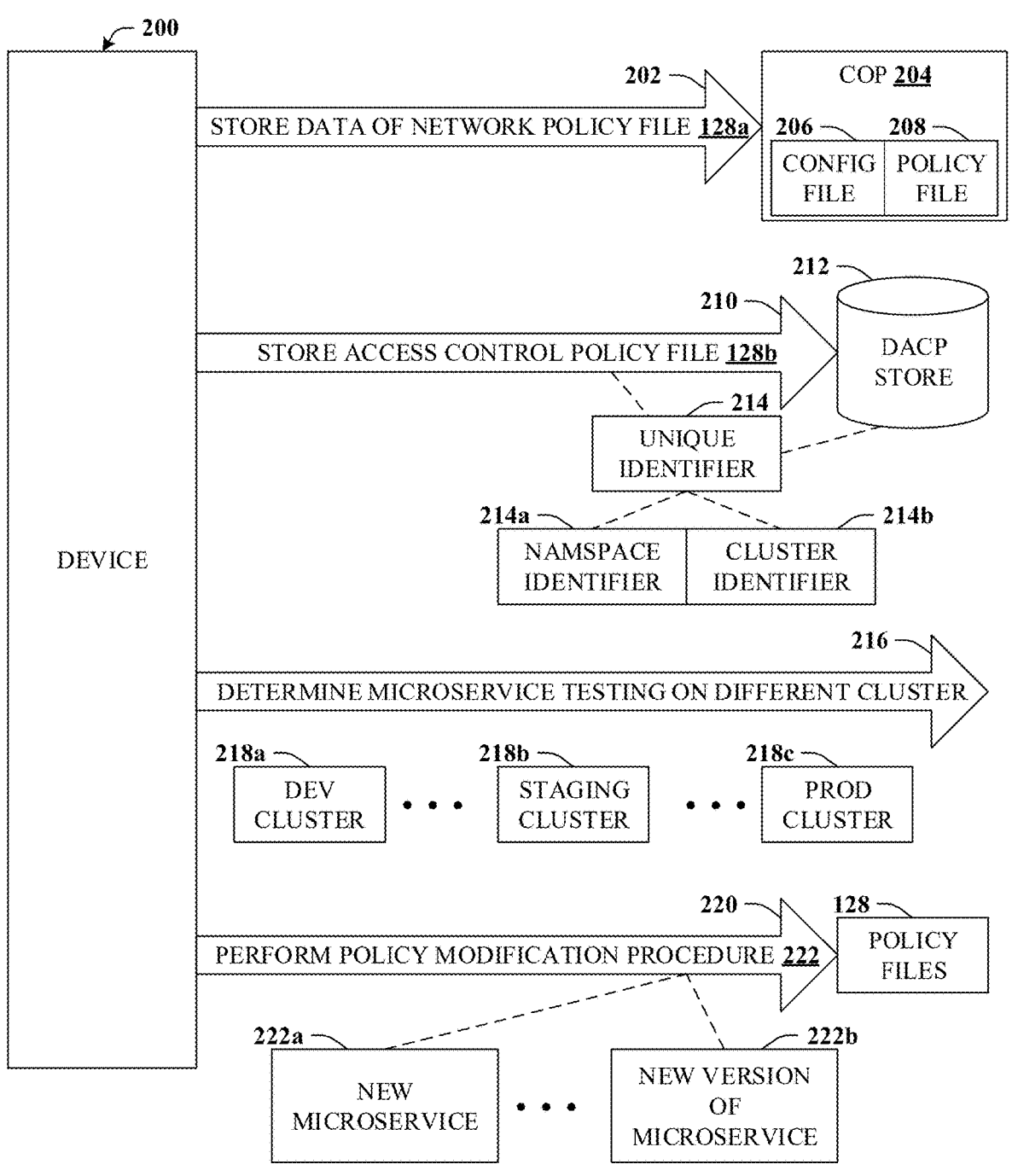
FIG. 2 depicts a schematic block diagram illustrating an example device 200 that can modify one or more of the group of policy files 128 to reduce resource allocation associated with testing microservice 116 in accordance with certain embodiments of this disclosure.

Turning now to FIG. 2, a schematic block diagram is depicted illustrating an example device 200 that can modify one or more of the group of policy files 128 to reduce resource allocation associated with testing microservice 116 in accordance with certain embodiments of this disclosure. Like device 100, in some embodiments, device 200 can be, or can be included in, a container orchestration platform. In some embodiments, device 200 can be the same device as device 100 or a different device. While not expressly shown, device 200 can comprise process 102, memory 104, or policy device 106, as detailed in connection with device 100 of FIG. 1.

At reference numeral 202, device 200 can store data of network policy file 128a to container orchestration platform 204 such as a configuration file 206, a policy file 208, or other suitable location of container orchestration platform 204. As indicated above, network policy file 128a and potentially other policy files 128 generated by device 100 (as discussed in connection with FIG. 1) can be similarly stored to appropriate destinations of container orchestration platform 204, which in subsequent figures can be referred to as a network policy.

However, with regard to access control policy file 128b, it is noted that container orchestration platforms typically do not provide additional storage for microservices that are hosted. Thus, access control policy file 128b can be stored to a distributed access control policy (DACP) store 212. In some embodiments, DACP store 212 can be configured as a distributed, shared store for multiple access control policy files 128b. For instance, DACP store 212 can store access control policy files 128b for many different microservices 116, potentially for many different developer entities 114 or other entities that utilize container orchestration platform 204.

In some embodiments, the various access control policy files 128b can be indexed within DACP store 212 by unique identifier 214. One example of unique identifier 214 can be a concatenation or combination of namespace identifier 214a and cluster identifier 214b. Namespace identifier 214a can be indicative of a namespace of container orchestration platform 204 that includes the associated microservice 116 and/or the associated API 117. Cluster identifier 214b can be indicative of an environment name or cluster name of container orchestration platform 204 (e.g., dev, staging, production).

At reference numeral 216, device 200 can determine that microservice 116 is to be tested on a different cluster 218. As noted previously, during the development and testing of microservice 116, it can be advantageous to provide independent stable environments by which developers can test at various stages of the development process. Typically, a given platform (e.g., COP 204) provides at least three different environments that can live in different clusters of the platform, namely dev cluster 218a, staging cluster 218b, and production cluster 218c. Other clusters can exist or may be known by different names such as a testing cluster, a pre-production cluster and so forth.

Rather than instantiating a new instance of the target environment in one of the existing clusters 218, at reference numeral 220, device 200 can instead perform policy modification procedure 222 to facilitate testing against a stable environment without consuming additional resources for constructing a new environment specifically for the microservice to be tested as was previously done. In that regard, policy modification procedure 222 can modify one or more of the group of policy files 128 that were generated by device 100. This modification can be based on information associated with the target environment.

For example, suppose microservice 116 resides in dev cluster 218*a*. After ongoing development, developer entity 114 determines it is advantageous to test microservice 116 in staging cluster 218*b* (e.g., the target environment). In response, such can prompt device 200 to perform policy modification procedure 222 based on information associated with the target environment.

It is appreciated that microservice 116 can be an entirely new microservice or a new version of an existing microservice that was previously developed by developer entity 114. In the former case, policy modification procedure 222*a* for a new microservice can be performed. In the latter case, policy modification procedure 222*b* for a new version can be performed.

Policy modification procedure 222*a* can relate to modifications to policy files 128 that operate to modify an ingress gateway policy and a network policy of the target environment, e.g., to route traffic between the original environment (e.g., dev cluster 218*a*) and the target environment (e.g., staging cluster 218*b*). Additional detail relating to these and similar concepts is further detailed in connection with FIG. 4.

Policy modification procedure 222*b* can relate to modifications to policy files 128 that operate to modify an ingress gateway policy and a network policy of the target environment, e.g., to route traffic intended for the previous microservice in the target environment to the new version in the original environment. Additional detail relating to these and similar concepts is further detailed in connection with FIG. 5.

By utilizing the disclosed techniques continuous development, testing, and operation of a cloud services platform and/or container orchestration platform can be improved via policy management automation. Such policy management automation can introduce new functions or affect and potentially enhance many existing aspects or functions of platform management such as, for example, network visibility and authorization policy declaration, policy review and approval, policy deployment, policy enforcement, policy customization, and policy compliance. Additional detail regarding each of the above functions are provided below and further in connection with FIGS. 3-7

Still referring to FIGS. 1 and 2, regarding network visibility and authorization policy declaration, the disclosed techniques can provide or leverage an existing developer portal of the platform to allow developers to import desired project definitions and desired API definitions such as representational state transfer (REST) APIs, which can be facilitated by UI 110 and/or connection 108 of FIG. 1. It is appreciated that developers (e.g., developer entity 114) are not required to grant the developer portal elements access to their other projects that may be hosted by a repository hosting service such as GitHub. A developer can select a namespace already defined in the developer portal or create a new namespace. The API definition can be defined in an OpenAPI v3 YAML file as one example. All APIs can be defined by type, including, e.g., public APIs, internal APIs, and private APIs as was detailed in connection with visibility data 118*a*.

As noted, UI 110 or other developer portal or tool can guide developers to specify network visibility policy by marking each API as public, internal, or private. This choice or selection can be saved as an extension attribute, with value in {public, internal, private, to the OpenAPI specification. The visibility policies can be saved in an associated Kubernetes configuration and/or policy files as noted in connection with reference numeral 202 of FIG. 2. Public API service endpoints can be defined in a Kubernetes virtual service YAML file. The visibility of public APIs or internal APIs can be defined in Kubernetes network policy files, for example.

Additionally, the developer portal can also specify visibility rules in the network policy file based on higher level policy compliance default settings. For example, the higher-level visibility policy may require locking down all APIs within the project selected Kubernetes namespace and exposing only public APIs and internal APIs outside the namespace.

Furthermore, with regard to authorization data 118*b*, the developer portal can guide developers to specify access control policy, such as what permissions are required to access an API and, optionally, under what condition, for each suitable API. The access control policy can be saved in an access control policy file, e.g., a YAML file such as access-control.yml.

Regarding policy review and approval, various files relating to policies or the like for a developer can be persisted by the developer portal. These files can include project Kubernetes namespace configuration YAML files as well as updated API definition files that can include network visibility markings (e.g., an OpenAPI v3 YAML file). The files can further include the generated policy files (e.g., group of policy files 128) which can include a network policy file YAML file (e.g., network policy file 128*a*), an access control policy file (e.g., access control policy file 128*b*), or other suitable policy files.

Developers can export any of the above policy files and import them elsewhere such as to associated GitHub projects. As indicated, the developer portal does not require developers to grant the portal access to their GitHub project. For platform internal development teams, associated projects can optionally grant the developer portal access to the GitHub project to automate this process.

To apply a policy to the platform, these policy files require platform review and approval to certify compliance to the platform rules. Developers can request a review explicitly when needed. Reviewed and approved policy files can be persisted into a developer portal source of truth repository and tracked by a unique approval ID. There can be different levels of reviews. For example, initially a light review process for development phase can be used to validate, e.g., existence of certain policy files or consistency of certain policy files and associated API definitions. Subsequently, e.g., when close to production, a rigorous and thorough review process can be implemented that additionally covers correctness of policy tiles, both syntax and semantics compliances, and so on.

Regarding policy deployment, it is appreciated that policy management of the platform can integrate policy deployment and microservice deployment. Thus, in some embodiments, when a platform deploys a microservice, typically via a continuous integration continuous development (CI/CD) pipeline, the platform can also apply policy files associated with that microservice at the same time. As noted, a platform typically has at least three development environments (e.g., dev, staging, and production). Based on the techniques detailed herein, policies for a given microservice can be deployed as a function of the development environment that is selected.

For example, in the context of a dev environment (e.g., dev cluster 218a), at deployment time, the CI/CD pipeline can validate the existence of one or more policy files 128. Further, a development project can be deployed into one namespace of dev environment, which is described in more detail in connection with FIG. 3.

Figure 3:
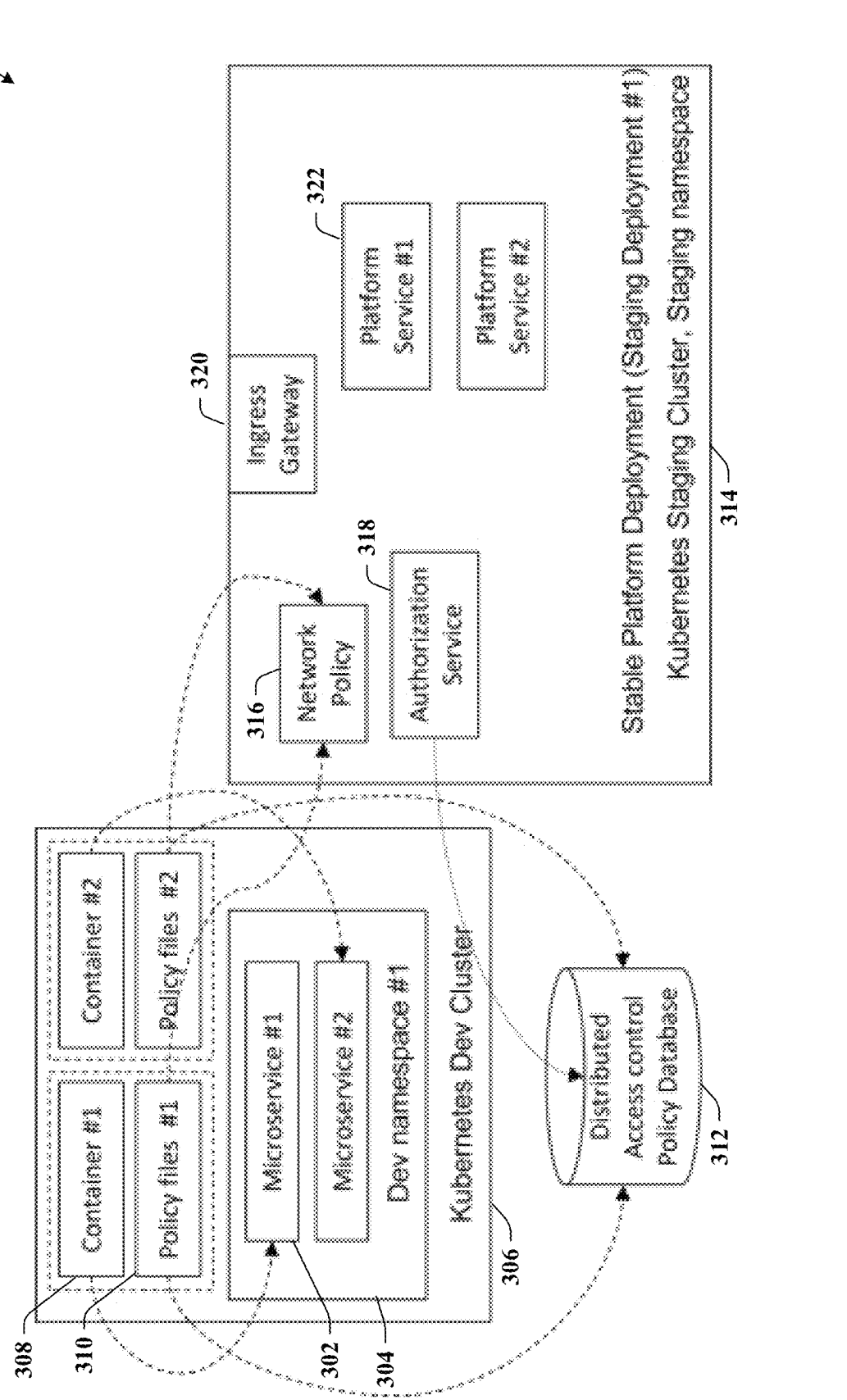
FIG. 3 depicts a schematic block diagram 300 illustrating an example system in which a microservice in a dev cluster can be tested against a staging cluster stable environment in accordance with certain embodiments of this disclosure.

Referring now to FIG. 3, a schematic block diagram 300 is depicted illustrating an example system in which a microservice in a dev cluster can be tested against a staging cluster stable environment in accordance with certain embodiments of this disclosure.

As depicted, one or more microservice 302 can reside in an associated dev namespace 304 of a dev cluster 306. One or more containers 308 can exist for associated microservices 302, which can contain policy files 310 that can be substantially similar to policy files 128. Dev cluster 306 and staging cluster 314 can be clusters of a container orchestration platform 204, in this case Kubernetes and can be substantially similar to dev cluster 218a and staging cluster 218b, respectively.

Staging cluster 314 can comprise network policy 316 (e.g., configuration files, policy files, or the like), authorization service 318, ingress gateway 320, and one or more platform service 322. As was noted, some policy files 310 (e.g., network policy file(s)) can be loaded to network policy 316 of staging cluster 314, while other policy files 310 (e.g., access control policy file(s)) can be provided to DACP store 312.

One advantage of this solution is that a development team can test a microservice in the same namespace to test inter-project accesses as defined by network policy files and can share and test against one platform services deployment to reduce platform resource consumption. Such can be accomplished by instructing the CI/CD pipeline to perform additional functions during a deployment process. These additional actions can be, e.g., to assign a unique dev namespace (e.g., dev namespace 304) to a project. In some embodiments, this unique dev namespace can be, or can be similar to, unique identifier 214. Subsequently, this can be modified by adjusting a namespace policy file.

Another additional action by the CI/CD pipeline can be to adjust the network policy to allow microservices (e.g., microservices 302 under test in the unique dev namespace 304) access to platform service(s) 322. Still another additional action taken by the CI/CD pipeline can be to load platform access control policy files to a platform access control policy data store such as DACP store 312 in a manner that can be used by authorization service 318. DACP store 312 can be distributed and can support platforms that are in multiple data centers.

In some embodiments, the CI/CD pipeline can (e.g., by default) load the policy files from an associated developer repository. In this case, policy files that are associated with container images of their microservices can be used. In some embodiments, as an additional option, a developer can specify that the CI/CD pipeline is to load the policy files from the developer portal's source of truth policy repository when developers want to test the review approved policy files.

With regard to a staging environment, projects of a developer can be deployed to a staging environment following a similar process, but distinctions can be made for different scenarios. In a first scenario the microservice represents a new service. This can be similar to case 222a of FIG. 2 and is further detailed in connection with FIG. 4. In a second scenario the microservice represents a new version of the service. This can be similar to case 222b of FIG. 2 and is further detailed in connection with FIG. 5.

Figure 4:
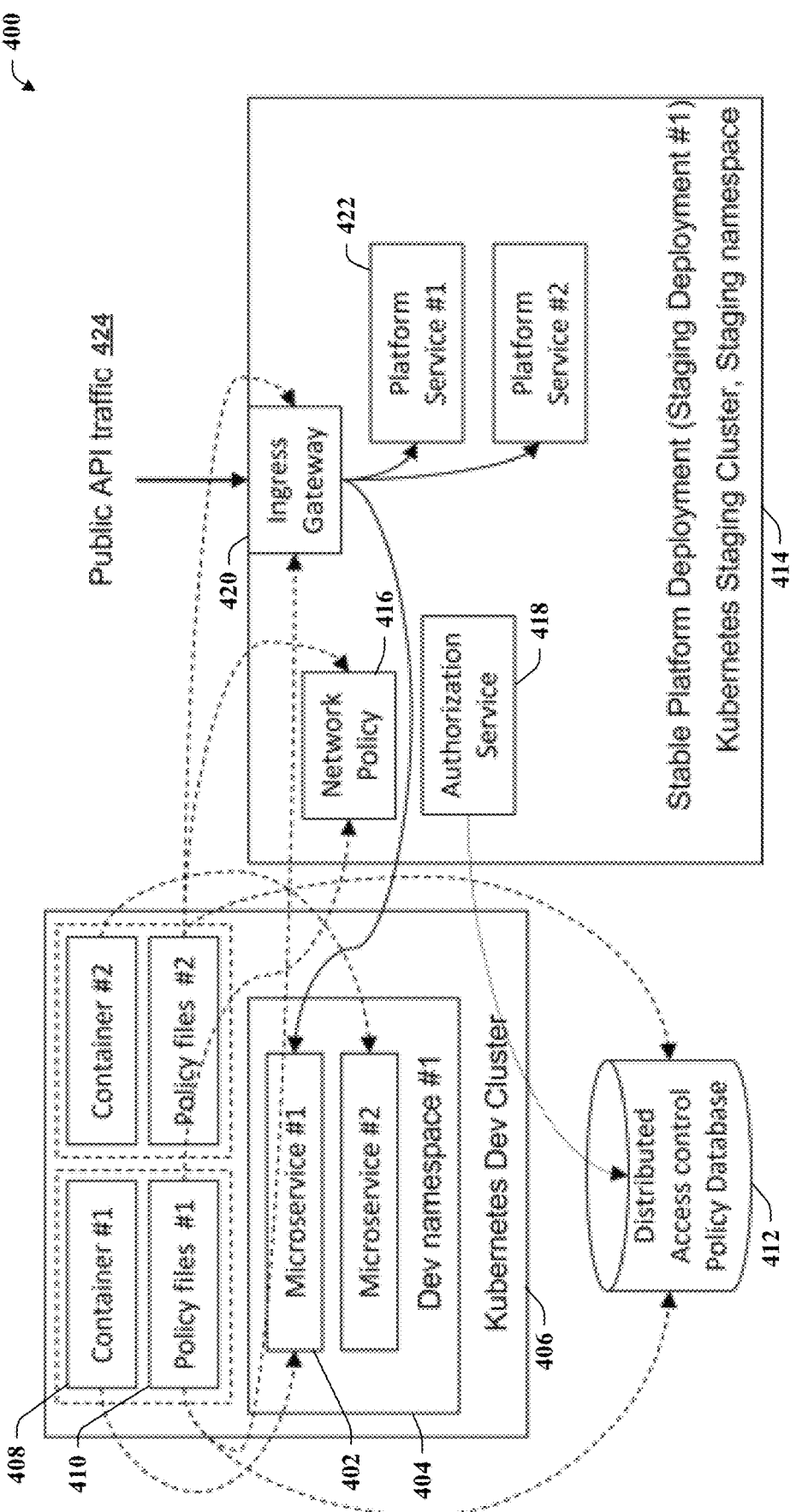
FIG. 4 depicts a schematic block diagram 400 illustrating an example system in which a new microservice in a dev cluster can be tested against a staging cluster stable environment in accordance with certain embodiments of this disclosure.

Turning now to FIG. 4, a schematic block diagram 400 is depicted illustrating an example system in which a new microservice in a dev cluster can be tested against a staging cluster stable environment in accordance with certain embodiments of this disclosure. Elements 402-422 can be substantially similar to associated like elements 302-322 detailed in connection with FIG. 3.

In this case, deploying to the staging environment can be similar to or identical to deploying to the dev environment with the exception of a few differences. For example, the service offer (e.g., microservice 402) can be tested as part of the platform. The CI/CD pipeline can deploy the virtual service policy to allow public API access (e.g., public API traffic 424) to access the new service offering. Another difference is an associated CI/CD process can, in some embodiments, use review approved policy files. Optionally, in some embodiments, developers can specify that the CI/CD is to use policy files that are associated with the container images in their repository, e.g., if the purpose is to test the latest policy file changes.

Figure 5:
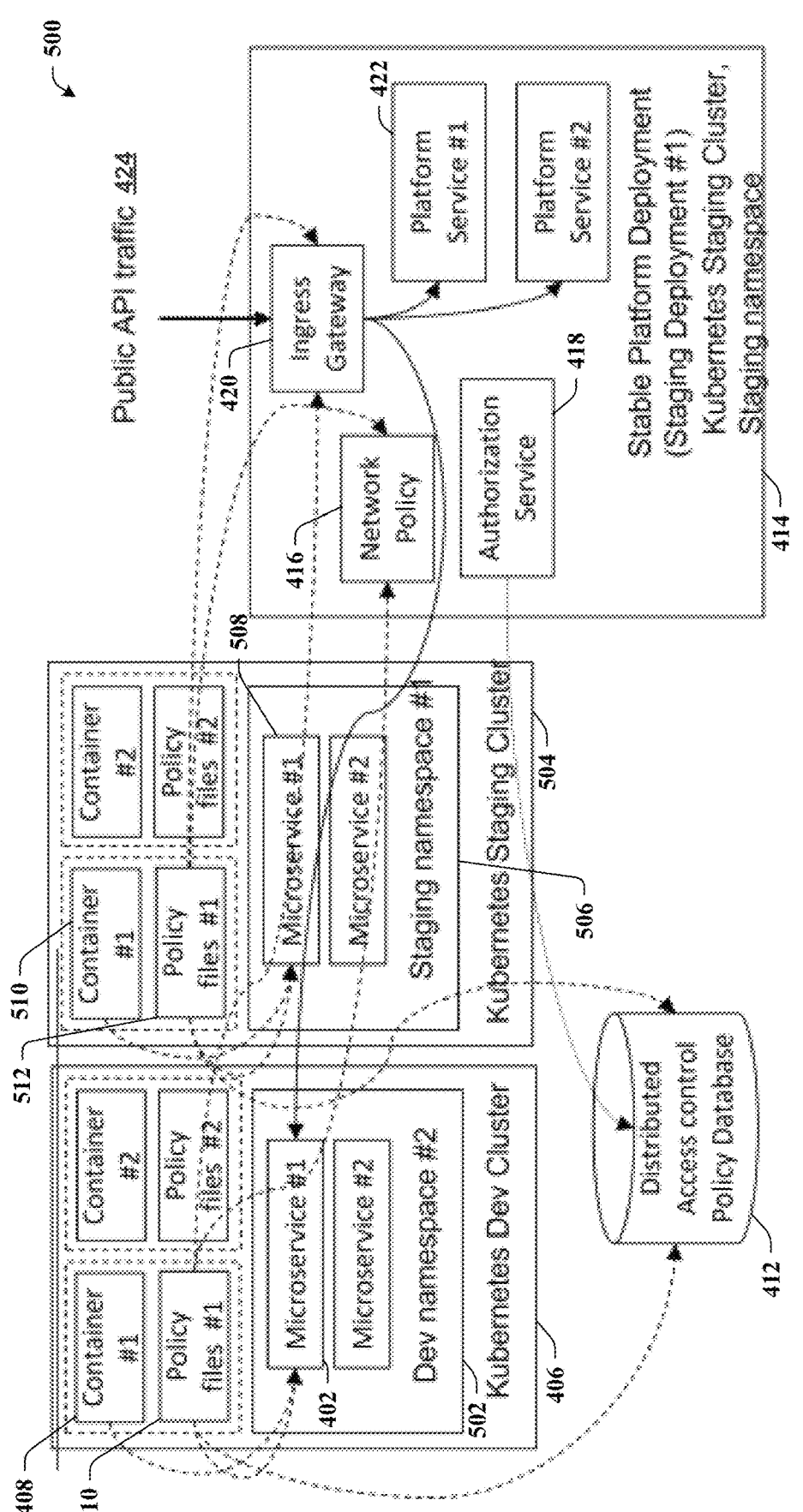
FIG. 5 depicts a schematic block diagram 500 illustrating an example system in which a new version of a microservice in a dev cluster can be tested against a staging cluster stable environment having a previous version of the microservice in accordance with certain embodiments of this disclosure.

Referring now to FIG. 5, a schematic block diagram 500 is depicted illustrating an example system in which a new version of a microservice in a dev cluster can be tested against a staging cluster stable environment having a previous version of the microservice in accordance with certain embodiments of this disclosure. In this scenario, it is noted that dev namespace 502 can differ from dev namespace 404.

Here, staging cluster 504 is illustrated beside dev cluster 406 where the new version (e.g., microservice 402) resides. Staging cluster 504 can comprise staging namespace 506 where the original version (e.g., microservice 508) resides, having associated container(s) 510 and policy files 512.

In this scenario, new changes can be deployed to a service offering that is already hosted on the platform. When deploying the modified offer to the dev environment, the CI/CD pipeline can be instructed to modify a policy for ingress gateway 420. For example, network policy 416 can be modified to route traffic (e.g., public API traffic 424 to the changed version (e.g., microservice 402) in the dev environment (e.g., dev cluster 406). The CI/CD pipeline can be instructed to load access control policy relating to the changed service offer to the distributed access control policy repository 412. An access control policy can be indexed by a unique identifier such as unique identifier 214. For example, the access control policy can be indexed by the deployed cluster name (e.g., cluster identifier 214b) and the deployed namespace name (e.g., namespace identifier 214a). In this case two copies of the access control policies can coexist in the database because the cluster name and namespace name are both different, which can be advantageous to uniquely identify the two copies.

Hence, by leveraging CI/CD processes, ingress gateway 420 and network policy 416 can be adjusted to route staging API traffic 424 for the offer entirely to the new version for testing in the dev environment. Alternatively, such can be configured to support a canary test configuration whereby only some percentage of API traffic 424 is routed to the new version and remaining percentage of API traffic 424 is routed to the existing version.

Figure 6:
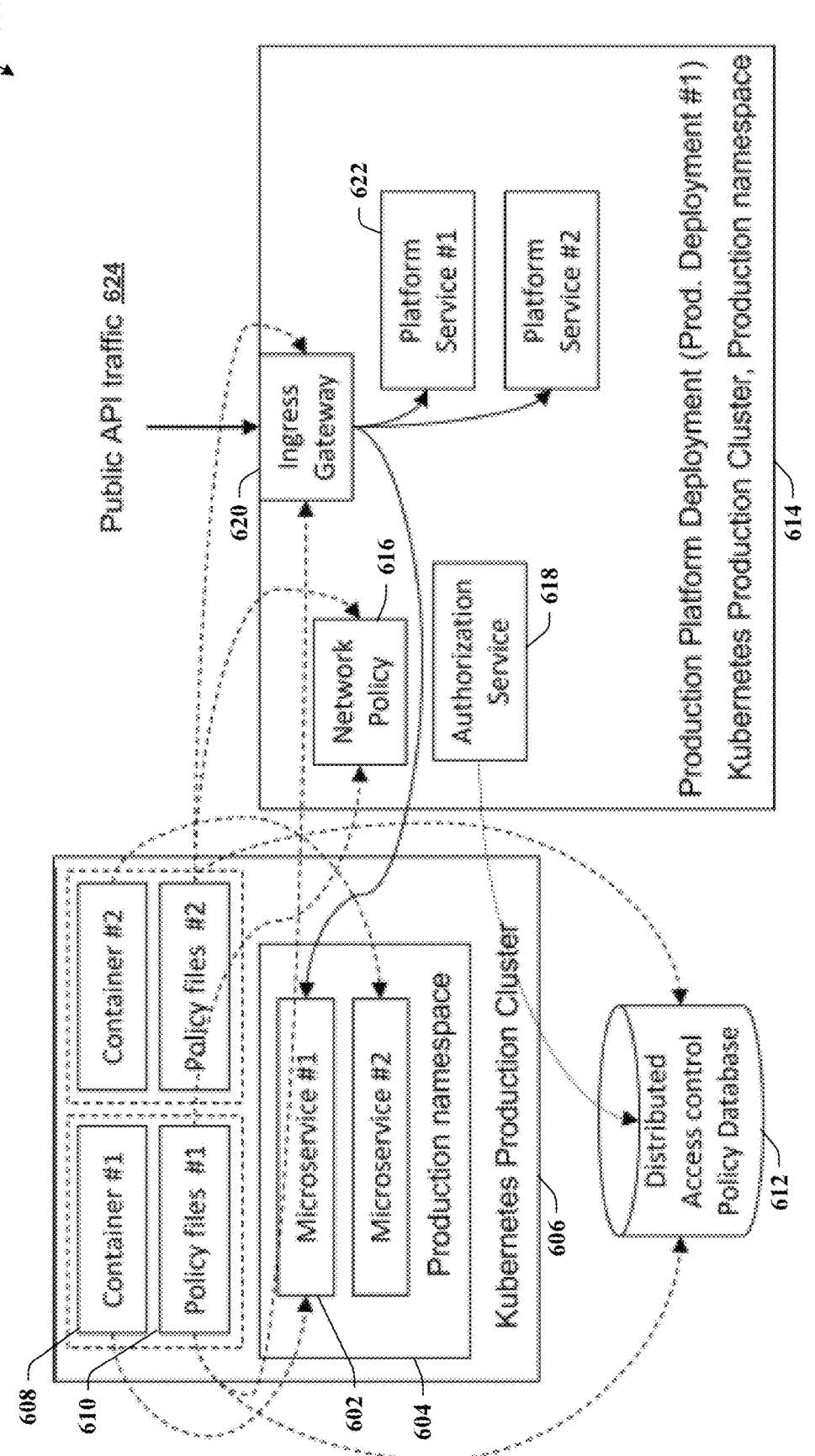
FIG. 6 depicts a schematic block diagram 600 illustrating an example system in which a microservice in a dev cluster can be tested against a production cluster as part of the stable environment in accordance with certain embodiments of this disclosure.

With reference now to FIG. 6, a schematic block diagram 600 is depicted illustrating an example system in which a microservice in a dev cluster can be tested against a production cluster as part of the stable environment in accordance with certain embodiments of this disclosure. In some embodiments, elements 602-624 can be substantially similar to associated like elements 402-424 detailed in connection with FIG. 4.

With regard to a production environment, microservices can be deployed to the platform production environment as part of the production environment. In this scenario, the CI/CD pipeline can deploy projects to production that use formally reviewed and approved policy files. For example, only the policy files reviewed and approved through the rigorous and thorough process noted above. Deployment can fail if the CI/CD pipeline cannot find formally approved versions of the policy files from the source of truth platform repository or another suitable or designated location. The CI/CD pipeline typically does not adjust anything in the formally approved policy file versions.

The disclosed techniques offer significant advantages over previous solutions or techniques. For example, on the network policy side, as a comparison, only supported static network policies. As a result of typical rigid policy management constraints, a microservice was required to have multiple copies of network policy, one for dev, one for staging, one for production, and so on. Moreover, more deployment resources are required for previous techniques. For example, additional pods and containers are required for development testing, which is further detailed in connection with FIG. 7.

On the access control policy side, new microservices and new access control policies can be added to existing cluster deployment and enforced on-demand. For instance, authorization service 718 can import access control policies from DACP store 712 and load dynamically load the access control policies. In contrast, in previous solutions, a redeployment of the authorization service is required. In other words, whenever some relevant items change (e.g., a manifest configuration or the like) the service required stopping and restarting. With respect to the disclosed techniques, on-demand loading of policies is supported.

Figure 7:
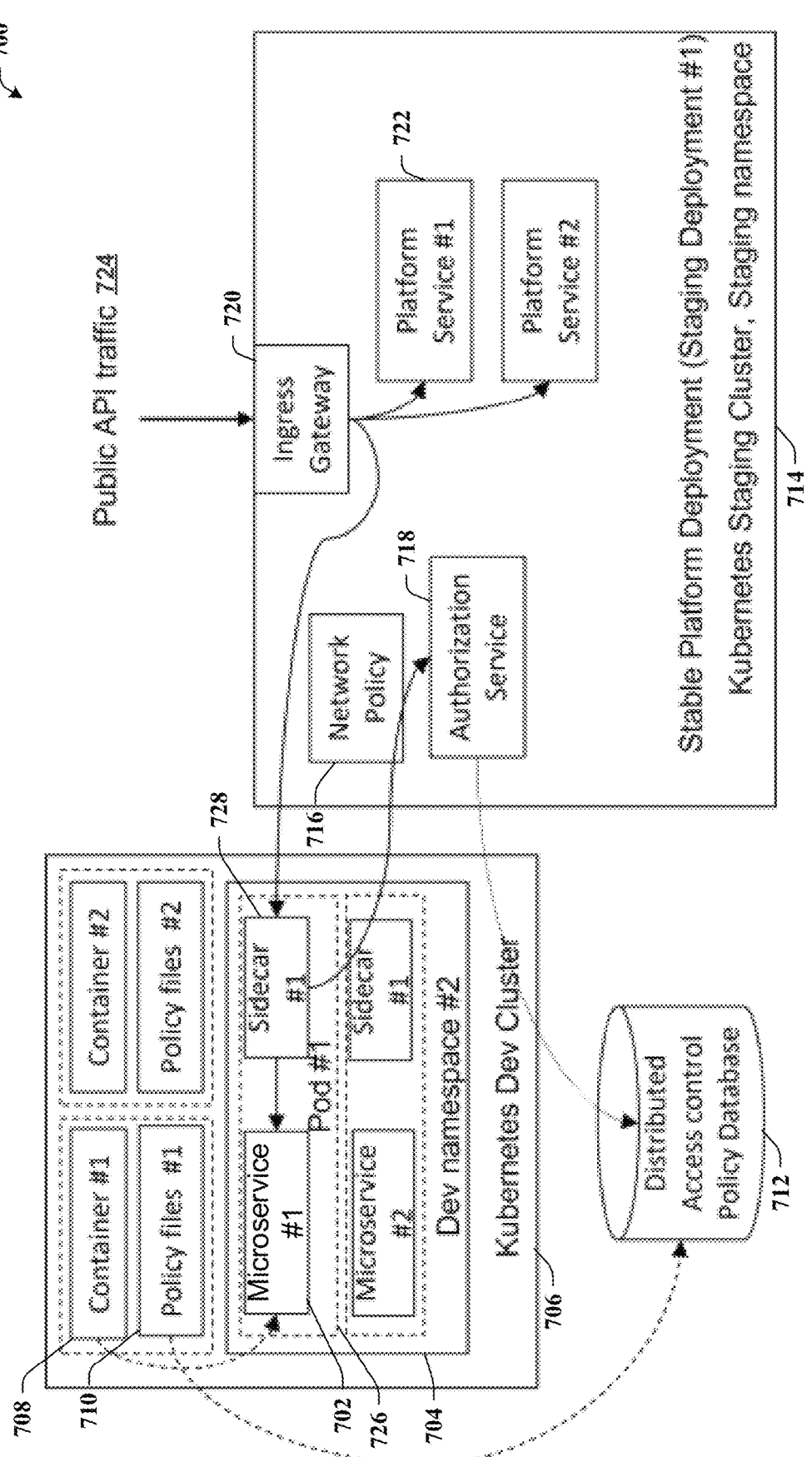
FIG. 7 depicts a schematic block diagram 700 illustrating an example system in which network policies of a microservice can be enforced upon deployment of the microservice in accordance with certain embodiments of this disclosure.

Turning now to FIG. 7, a schematic block diagram 700 is depicted illustrating an example system in which network policies of a microservice can be enforced upon deployment of the microservice in accordance with certain embodiments of this disclosure. In some embodiments, elements 702-724 can be substantially similar to associated like elements 602-624 detailed in connection with FIG. 6.

As detailed previously, network policies can be adjusted via CI/CD pipeline processes based on the deployment type. With regard to policy enforcement, network policies can be enforced upon deployment. As indicated, the CI/CD pipeline can load access control policies during deployment and enforce the new access control policy at runtime of microservice 702.

When APIs of a microservice on the platform are accessed, the disclosed techniques can leverage a security interceptor to enforce the access control policy. As such, only authorized API requests are passed to the microservices to process. Unauthorized API requests can be rejected by the security interceptor. According to the disclosed techniques, the security interceptor can be implemented in sidecar 728. In some embodiments, sidecar 728 can be an Istio sidecar via a Lua filter.

The CI/CD pipeline can deploy a microservices (e.g., microservice 702) to pod 726 and initiate sidecar 728 in the pod 726. All or a portion of API traffic 724 to the microservice 702 can be intercepted by the sidecar 728. The security interceptor can utilize authorization service 718 to enforce access control policy. For example, the security interceptor can invoke authorization service 718 to validate user access.

In that regard, the security interceptor can pass certain data to authorization service 718. The data that is passed can include, e.g., an authenticated API requester identifier and an API uniform resource identifier (URI) path. The data passed can further include the cluster name, the namespace name, or other suitable data.

Authorization service 718 can utilize the authenticated API requester identifier to retrieve the user security context. Authorization service 718 can utilize the cluster name, the namespace name, and optionally the API URI path as index to lookup the access control policy from the distributed access control policy repository 712. Once the access control policy data is retrieved from DACP 712, authorization service 718 can validate whether the requester has the required permissions to invoke the intended API.

With regard to policy customization, it is observed that in the context of policy deployment detailed above, the CI/CD pipeline can be leveraged to deploy associated policies when deploying a microservice. During the process of development of the microservice, the CI/CD pipeline can support various test configurations. These test configurations can include testing a development deployment against a stable staging deployment, testing a development deployment against a stable staging deployment as a new service as part of the staging environment, or testing a development deployment as a new version of an existing service that is part of a stable staging deployment.

The above advantages become possible because in accordance with the disclosed techniques, the CI/CD pipeline can be leveraged to adjust the network policies in order to control service visibility and traffic routing when deploying the microservice under testing. Moreover, the CI/CD pipeline can load access control policies into a distributed access control policy repository so that multiple versions of access control policies of a service can coexist to be used at runtime depending on the deployment desired. When testing a new version of a service, the service in the dev cluster and in the staging cluster can use different versions of access control policies, which can be distinguished unique identifiers.

Another advantage of the disclosed techniques is that one set of resources, e.g., microservices of one staging environment, can be used to support testing N dev deployments, where N can be the number of microservices on the platform being tested or developed, which is typically much greater than one. Moreover, any one of the N tests can be in any one of the test configurations. This is a significant part of resource optimization. As a comparison, previous solution test configurations required a complete set of microservices for each test case. The disclosed techniques can therefore reduce the resource requirements for testing by a factor of N.

With regard to policy compliance, the disclosed techniques can integrate policy compliance as an integral part of the development and testing process. The developer portal or associated tool can provide multiple policy compliance review processes, as detailed previously with regard to sections relating to policy review and approval. For example, a first policy compliance review process can be a lightweight review process that allows developers to get compliance review feedback early on in the development process as needed. A second policy compliance review process can be a rigorous and thorough review process that can ensure a new service offering is compliant.

The second policy compliance review process can ensure that service and URI resource names are consistent with platform synergy and ecosystem dynamics, ensure API and URI style and behavior are consistent with platform guidelines, ensure the correctness of network policy and access control policies, or other suitable review processes. Treating policy compliance as an integral part of the development process can significantly improve platform and service reliability and improve overall security.

As a result of the numerous techniques detailed herein, the disclosed subject matter can provide numerous advantages. For example, in some embodiments, the disclosed techniques can facilitate declarative policy configuration. For instance, a developer portal tool can guide developers to declare network visibility and access control requirement(s) on service APIs. The tool can then generate network visibility policies and access control policies accordingly, without further input from the developer.

In some embodiments, the disclosed techniques can facilitate on-demand policy deployment. For example, the CI/CD pipeline can load and apply policies when deploying the project microservices. In some embodiments, the disclosed techniques can facilitate dynamic policy customization. For example, the CI/CD pipeline can adjust network visibility policies to support multiple deployment and test configuration patterns using one set of policies.

In some embodiments, the disclosed techniques can facilitate dynamic policy enforcement. For example, the CI/CD pipeline can load access control policies to a distributed database with unique index. At runtime, an authorization service can look up the access control policy from the database to locate the correct version of the policy. Multiple access control policy versions can coexist to support coexistence of multiple test configurations.

In some embodiments, the disclosed techniques can facilitate a significant reduction in test resources utilized. For example, via dynamic policy customization, techniques detailed herein can reduce the resources required by development testing by a factor of N, where N is number of microservices being developed and tested. In some embodiments, the disclosed techniques can facilitate integrated policy compliance. For example, integrated policy review and approval process can ensure policy correctness and compliance.

Example Methods

Figure 8:
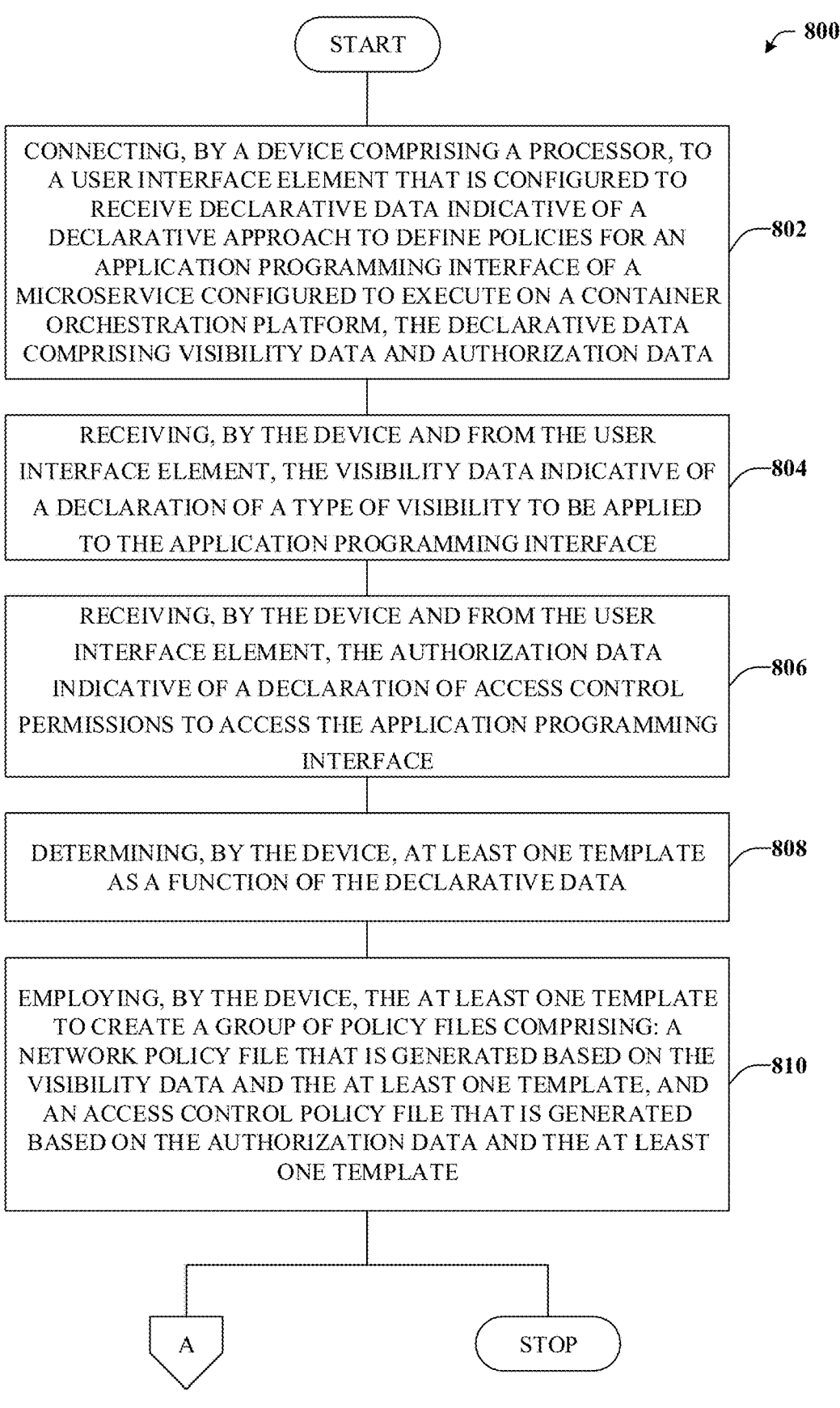
FIG. 8 illustrates an example method that can automatically generate policies based on high-level declarations in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 can automatically generate policies based on high-level declarations in accordance with certain embodiments of this disclosure. While method 800 describes a complete method, in some embodiments, method 800 can include one or more elements of method 900, as illustrated by insert A.

At reference numeral 802, a device comprising a processor can connect to a user interface element. The user interface element can be configured to receive declarative data indicative of a declarative approach to define policies for an application programming interface of a microservice. The microservice can be configured to execute on a container orchestration platform and the declarative data can comprise visibility data and authorization data.

At reference numeral 804, the device can receive, from the user interface element, the visibility data. The visibility data can be indicative of a declaration of a type of visibility to be applied to the application programming interface.

At reference numeral 806, the device can receive, from the user interface element, the authorization data. The authorization data can be indicative of a declaration of access control permissions to access the application programming interface.

At reference numeral 808, the device can determine at least one template as a function of the declarative data. At reference numeral 810, the device can employ the at least one template to create a group of policy files. The group of policy files can comprise at least: a network policy file that is generated based on the visibility data and the at least one template, and an access control policy file that is generated based on the authorization data and the at least one template. Method 800 can terminate or proceed to insert A, which is further detailed in connection with FIG. 9.

Turning now to FIG. 9, exemplary method 900 is depicted. Method 900 can provide for additional aspects or elements in connection with automatically generating policies based on high-level declarations in accordance with certain embodiments of this disclosure.

At reference numeral 902, the device introduced at reference numeral 802 comprising a processor can store the access control policy file to a distributed access control policy data store. The distributed access control policy data store can be configured as a shared store for multiple access control policy files for multiple different entities that utilize the container orchestration platform.

At reference numeral 904, the device can index the access control policy file with the distributed access control policy data store by a unique identifier. In some embodiments, the unique identifier can comprise a namespace identifier, a cluster identifier, or other suitable data.

At reference numeral 906, in response to determining that the microservice, residing in a first cluster of the container orchestration platform, is to be tested with respect to a second cluster, different than the first cluster, of the container orchestration platform, the device can perform a policy modification procedure. The policy modification procedure can modify the group of policy files based on information associated with the second cluster.

Example Operating Environments

Figure 10:
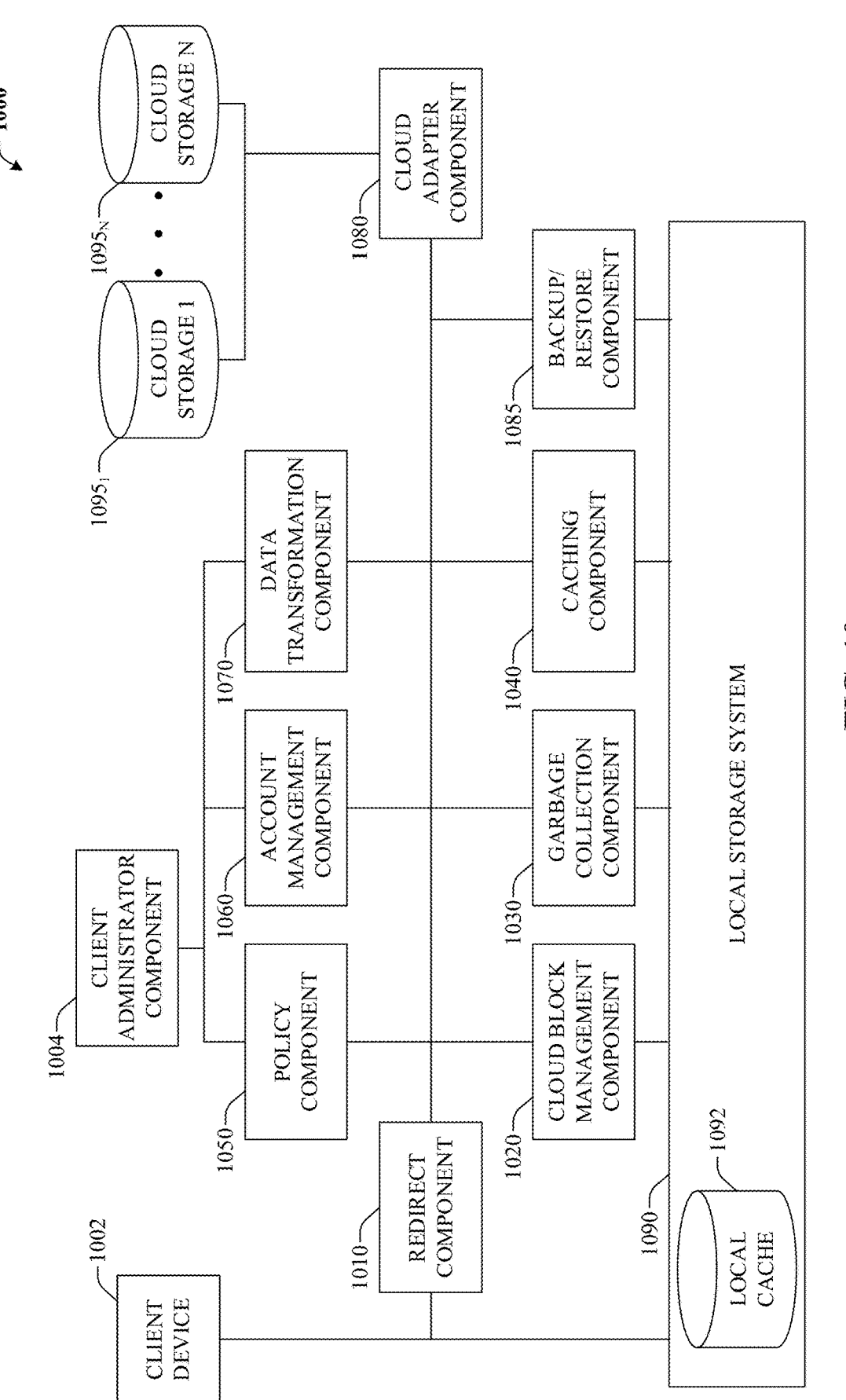
FIG. 10 illustrates a block diagram of an example distributed file storage system that employs tiered cloud storage in accordance with certain embodiments of this disclosure.
Figure 11:
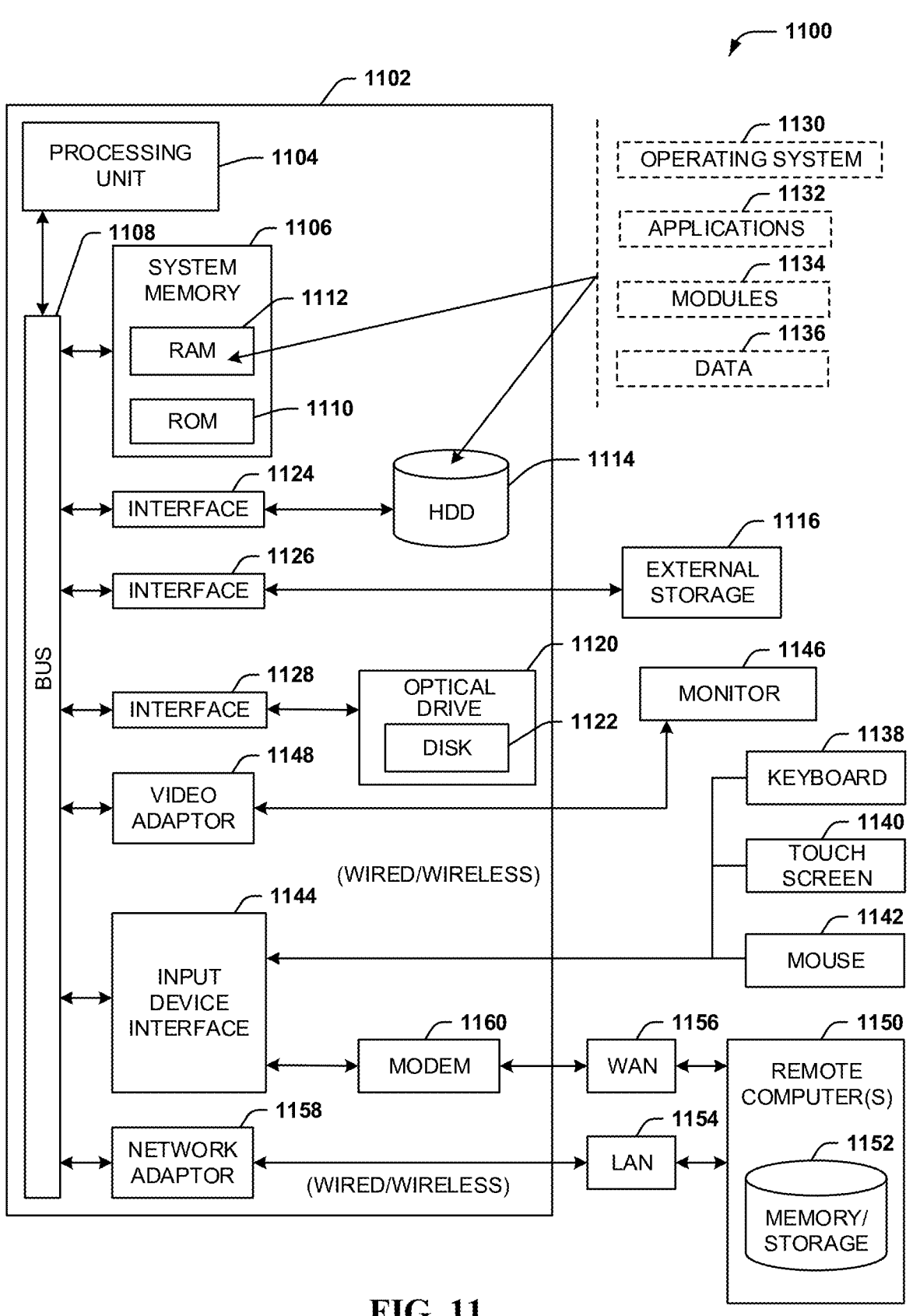
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 1095$_1$ and cloud storage N 1095$_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:

at least one processor; and at least one memory that stores executable instructions that, when executed by the at least one processor, facilitate performance of operations, comprising:

establishing a connection with a user interface element that is, based on developer identifier data, configured to receive declarative data indicative of a declarative approach for definition of policies for an application programming interface of a microservice, the declarative data comprising visibility data and authorization data;

receiving, from the user interface element, the visibility data indicative of a declaration of a type of visibility to be applied to the application programming interface;

receiving, from the user interface element, the authorization data indicative of a declaration of access control permissions to access the application programming interface;

selecting at least one template based on the declarative data;

generating a group of policy files based on the at least one template, the group of policy files comprising:

a network policy file that is generated based on the visibility data and the at least one template; and an access control policy file that is generated based on the authorization data and the at least one template; and in response to determining that the microservice, residing in a first cluster of a container orchestration platform, is to be tested with respect to a second cluster, different than the first cluster, of the container orchestration platform, performing a policy modification procedure that modifies the group of policy files based on information associated with the second cluster.

2. The device of claim 1, wherein the developer identifier data is indicative of a namespace, of a developer entity associated with the microservice, of a container orchestration platform.

3. The device of claim 2, wherein the type of visibility is:

a public type that indicates the application programming interface is to be visible to first entities outside of a network of the developer entity;

an internal type that indicates the application programming interface is to be visible only to second entities that are included in the network of the developer entity; or a private type that indicates the application programming interface is to be visible only to third entities that are included in the namespace of the developer entity.

4. The device of claim 1, wherein the authorization data further comprises one or more permissions and conditions, satisfaction of which allows access to the application programming interface.

5. The device of claim 1, wherein the operations further comprise, storing data of the network policy file to a configuration file or a policy file of an associated container orchestration platform.

6. The device of claim 1, wherein the operations further comprise, storing the access control policy file to a distributed access control policy data store configured as a shared store for multiple access control policy files for multiple different entities that utilize an associated container orchestration platform.

7. The device of claim 6, wherein the access control policy file is indexed within the distributed access control policy data store by a unique identifier.

8. The device of claim 7, wherein the unique identifier comprises:

a namespace identifier indicative of a namespace of the associated container orchestration platform that includes the application programming interface; and a cluster identifier indicative of a cluster name of the associated container orchestration platform.

9. The device of claim 1, wherein the operations further comprise, in response to a determination that the microservice represents a new microservice to be deployed to the container orchestration platform, updating an ingress gateway policy and a network policy of the second cluster to route traffic between the first cluster and the second cluster.

10. The device of claim 1, wherein the operations further comprise, in response to a determination that the microservice represents an updated version of a previous microservice deployed to the container orchestration platform, updating an ingress gateway policy and a network policy of the second cluster to route traffic intended for the previous microservice of the second cluster to the microservice of the first cluster.

11. The device of claim 1, wherein the first cluster and the second cluster are different ones of a group of clusters comprising a development cluster, a testing cluster, a staging cluster, a pre-production cluster, or a production cluster.

12. A non-transitory computer-readable medium comprising instructions that, in response to execution, cause a system comprising at least one processor to perform operations, comprising:

receiving, from a user interface element that is configured to receive as input declarative data indicative of a declarative process applicable to policies for an application programming interface of a microservice configured to execute on a container orchestration platform, the declarative data comprising:

visibility data indicative of a declaration of a type of visibility to be applied to the application programming interface; and authorization data indicative of a declaration of access control permissions to access the application programming interface;

determining at least one template as a function of the declarative data;

utilizing the at least one template to create a group of policy files comprising: a network policy file that is generated based on the visibility data and the at least one template, and an access control policy file that is generated based on the authorization data and the at least one template; and in response to determining that the microservice, residing in a first cluster of the container orchestration platform, is to be tested with respect to a second cluster, different than the first cluster, of the container orchestration platform, performing a policy modification procedure that modifies the group of policy files based on information associated with the second cluster.

13. The non-transitory computer-readable medium of claim 12, wherein the operations further comprise, storing the access control policy file to a distributed access control policy data store configured as a shared store for multiple access control policy files for multiple different entities that utilize the container orchestration platform.

14. The non-transitory computer-readable medium of claim 13, wherein the access control policy file is indexed within the distributed access control policy data store by a unique identifier comprising at least one of a namespace identifier or a cluster identifier.

15. A method, comprising:

connecting, by a device comprising at least one processor, to a user interface element that is configured to receive declarative data indicative of a declarative approach to define policies for an application programming interface of a microservice configured to execute on a container orchestration platform, the declarative data comprising visibility data and authorization data;

receiving, by the device and from the user interface element, the visibility data indicative of a declaration of a type of visibility to be applied to the application programming interface;

receiving, by the device and from the user interface element, the authorization data indicative of a declaration of access control permissions to access the application programming interface;

determining, by the device, at least one template as a function of the declarative data;

employing, by the device, the at least one template to create a group of policy files comprising: a network policy file that is generated based on the visibility data and the at least one template, and an access control policy file that is generated based on the authorization data and the at least one template; and in response to determining that the microservice, residing in a first cluster of the container orchestration platform, is to be tested with respect to a second cluster, different than the first cluster, of the container orchestration platform, performing, by the device, a policy modification procedure that modifies the group of policy files based on information associated with the second cluster.

16. The method of claim 15, further comprising storing, by the device, the access control policy file to a distributed access control policy data store configured as a shared store for multiple access control policy files for multiple different entities that utilize the container orchestration platform.

17. The method of claim 16, further comprising indexing, by the device, the access control policy file within the distributed access control policy data store by a unique identifier.

18. The method of claim 15, wherein connecting to the user interface element comprises connecting to the user interface element based on developer identifier data, and wherein the developer identifier data is indicative of a namespace, of a developer entity associated with the microservice, of a container orchestration platform.

19. The method of claim 15, wherein the authorization data further comprises one or more permissions and conditions, satisfaction of which allows access to the application programming interface.

20. The method of claim 15, further comprising:

storing, by the device, data of the network policy file to a configuration file or a policy file of an associated container orchestration platform.

* * * * *